United States Patent
Miyashita

(10) Patent No.: US 9,581,513 B2
(45) Date of Patent: Feb. 28, 2017

(54) DIAPHRAGM-TYPE PRESSURE GAUGE

(71) Applicant: CANON ANELVA CORPORATION, Asao-ku, Kawasaki-shi (JP)

(72) Inventor: Haruzo Miyashita, Machida (JP)

(73) Assignee: CANON ANELVA CORPORATION, Kawasaki-Shi, Kanagawa-Ken (JP)

( * ) Notice: Subject to any disclaimer, the term of this patent is extended or adjusted under 35 U.S.C. 154(b) by 155 days.

(21) Appl. No.: 14/244,469

(22) Filed: Apr. 3, 2014

(65) Prior Publication Data
US 2014/0208860 A1 Jul. 31, 2014

Related U.S. Application Data

(63) Continuation of application No. PCT/JP2012/005804, filed on Sep. 12, 2012.

(30) Foreign Application Priority Data

Oct. 5, 2011 (JP) .................................. 2011-220565
Apr. 4, 2012 (JP) .................................. 2012-085219

(51) Int. Cl.
*G01L 9/12* (2006.01)
*G01L 9/00* (2006.01)
*G01L 19/02* (2006.01)

(52) U.S. Cl.
CPC ............ *G01L 9/12* (2013.01); *G01L 9/0048* (2013.01); *G01L 9/0073* (2013.01); *G01L 9/125* (2013.01); *G01L 19/02* (2013.01)

(58) Field of Classification Search
CPC ........ G01L 9/0072; G01L 7/00; G01L 13/025; G01L 9/0075

(Continued)

(56) References Cited

U.S. PATENT DOCUMENTS 4,785,669 A * 11/1988 Benson .................. G01L 9/0072 73/718
4,930,353 A * 6/1990 Kato .......................... G01L 9/06 338/4

(Continued)

FOREIGN PATENT DOCUMENTS

JP 2-138776 A 5/1990
JP 8-136377 A 5/1996

(Continued)

OTHER PUBLICATIONS

Omron Corp, Pressure sensor and pressure sensor unit, JP 08-136377A, May 31, 1996.*

(Continued)

*Primary Examiner* — Lisa Caputo
*Assistant Examiner* — Nigel Plumb
(74) *Attorney, Agent, or Firm* — Buchanan Ingersoll & Rooney PC

(57) ABSTRACT

A diaphragm-type pressure gauge which is attached to a vessel to be measured and measures a pressure by introducing a gas inside the vessel includes a housing into which the gas is introduced, and a sensor unit which is arranged in the housing, and includes a diaphragm electrode, a measurement surface of which is arranged parallel to an introduction direction of the gas. When the housing is attached to the vessel, the measurement surface of the diaphragm electrode is arranged parallel to a direction of gravitational force.

12 Claims, 9 Drawing Sheets

(58) Field of Classification Search
USPC .......... 73/718, 715, 716, 717, 723, 724, 700
See application file for complete search history.

(56) References Cited

U.S. PATENT DOCUMENTS

| | | | | |
|---|---|---|---|---|
| 5,515,711 | A * | 5/1996 | Hinkle | G01L 27/005 73/1.58 |
| 7,704,774 | B2 * | 4/2010 | Mayer | B81C 1/0023 257/E21.001 |
| 2002/0011114 | A1 * | 1/2002 | Miyashita | G01L 9/0042 73/718 |
| 2005/0114070 | A1 * | 5/2005 | Dozoretz | G01L 13/00 702/140 |
| 2007/0275494 | A1 | 11/2007 | Mayer et al. | |
| 2007/0275495 | A1 * | 11/2007 | Mayer | B81C 1/00238 438/50 |

FOREIGN PATENT DOCUMENTS

| | | |
|---|---|---|
| JP | 2000-292559 A | 10/2000 |
| JP | 2001-255225 A | 9/2001 |
| JP | 2007-335857 A | 12/2007 |
| JP | 2009-014484 A | 1/2009 |
| JP | 2010-169665 A | 8/2010 |

OTHER PUBLICATIONS

International Search Report (PCT/ISA/210) mailed on Nov. 20, 2012, by the Japanese Patent Office as the International Searching Authority for International Application No. PCT/JP2012/005804.

Written Opinion (PCT/ISA/237) mailed on Nov. 20, 2012, by the Japanese Patent Office as the International Searching Authority for International Application No. PCT/JP2012/005804.

Office Action (Final) issued on Jul. 31, 2015, by the Japanese Patent Office in corresponding Japanese Patent Application No. 2013-537387, and an English translation of the Office Action. (8 pages).

\* cited by examiner

DIAPHRAGM-TYPE PRESSURE GAUGE

This application is a continuation of International Patent Application No. PCT/JP2012/005804 filed on Sep. 12, 2012, and claims priority to Japanese Patent Applications Nos. 2011-220565 filed on Oct. 5, 2011, and 2012-085219 filed on Apr. 4, 2012, the entire contents of which are incorporated herein by reference.

TECHNICAL FIELD

The present invention relates to a diaphragm-type pressure gauge.

BACKGROUND ART

In a process of manufacturing an electronic component or semiconductor product, thin film formation and etching can be performed in a vacuum apparatus. In the process, the internal pressure of the vacuum apparatus is adjusted to a predetermined pressure. To measure a pressure in a process, a diaphragm-type pressure gauge is often used, which can perform accurate pressure measurement regardless of the type of gas.

For example, a diaphragm-type pressure gauge having a diaphragm structure like that disclosed in PTL 1 is configured to make a diaphragm electrode deflect in accordance with a pressure. However, since the diaphragm electrode also deflects in the direction of gravitational force, attaching the electrode while it is tilting in the direction of gravitational force will cause an error in a measurement value. In order to correct an error in a measurement value based on the attaching angle of a diaphragm-type pressure gauge, for example, PTL 2 discloses a technique of correcting a measurement value based on the value of a tilt angle.

CITATION LIST

Patent Literature

PTL 1: U.S. Pat. No. 4,785,669
PTL 2: Japanese Patent Laid-Open No. 2010-169665

SUMMARY OF INVENTION

Technical Problem

However, providing an angle sensor will increase the number of components. In addition, in order to correct a measurement value based on angle information, it is necessary to prepare in advance data concerning changes in the capacitance of a diaphragm electrode depending on tilt angles.

It is an object of the present invention to provide a technique of more easily solving the problem of a measurement error caused by the deformation of a diaphragm electrode due to the gravitational force.

Solution to Problem

A diaphragm-type pressure gauge according to the first aspect of the present invention, is attached to a vessel to be measured and measures a pressure by introducing a gas inside the vessel, and comprises a housing into which the gas is introduced, and a sensor unit which is arranged in the housing, and includes a diaphragm electrode, a measurement surface of which is arranged parallel to an introduction direction of the gas, wherein when the housing is attached to the vessel, the measurement surface of the diaphragm electrode is arranged parallel to the direction of gravitational force.

A diaphragm-type pressure gauge according to the second aspect of the present invention, is attached to a vessel to be measured and measures a pressure by introducing a gas inside the vessel, and comprises a housing into which the gas is introduced, a sensor unit which is arranged in the housing, and includes a diaphragm electrode, a measurement surface of which is arranged parallel to an introduction direction of the gas, and an attaching portion configured to attach the housing to the vessel so as to make the measurement surface of the diaphragm electrode parallel to the direction of gravitational force.

A diaphragm-type pressure gauge according to the third aspect of the present invention measures a pressure in a vessel to be measured, and comprises a housing having an internal space communicating with an inside of the vessel, a sensor unit which is arranged in the internal space and includes a fixed electrode and a diaphragm electrode facing the fixed electrode, and an attaching portion configured to attach the housing to the vessel, wherein a measurement surface of the diaphragm electrode which faces the fixed electrode is parallel to a direction in which a gas inside the vessel flows in the internal space, and an outer surface of the housing is provided with a mark with which the diaphragm-type pressure gauge is attached to the vessel so as to make the measurement surface parallel to the direction of gravitational force.

Advantageous Effects of Invention

The present invention provides a technique of more easily solving the problem of a measurement error caused by the deformation of a diaphragm electrode due to the gravitational force.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated in and constitute a part of the specification, illustrate exemplary embodiments of the invention and, together with the description, serve to explain the principles of the present invention.

DESCRIPTION OF EMBODIMENTS

Figure 1:
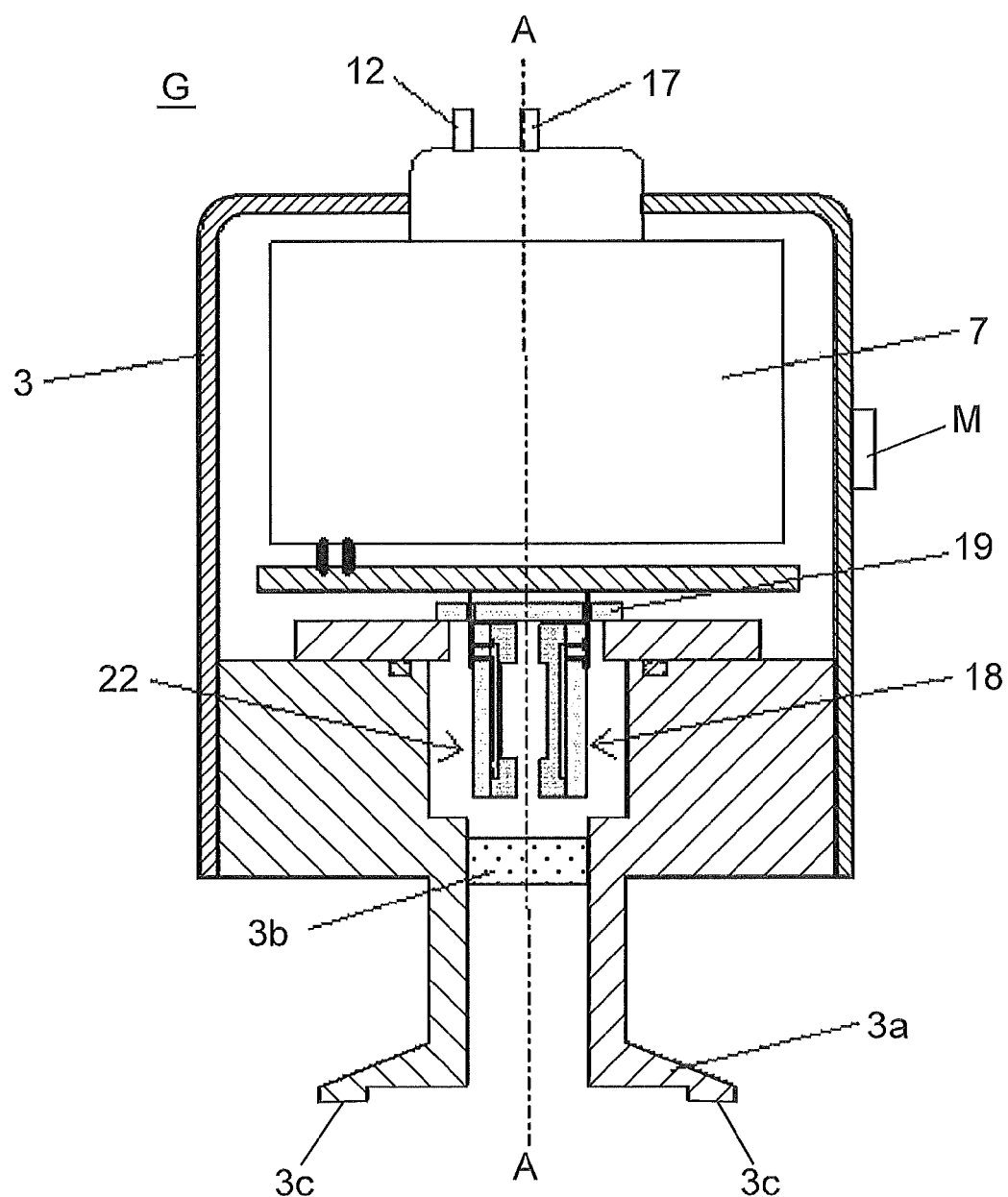
FIG. 1 is a schematic view of a diaphragm-type pressure gauge according to an embodiment of the present invention.

FIG. 1 shows a diaphragm-type pressure gauge G according to an embodiment of the present invention. The diaphragm-type pressure gauge G is a pressure gauge which is attached to a vacuum vessel (vessel to be measured) 2 (see FIG. 4) and measures a pressure upon introducing a gas from the inside of the vacuum vessel 2. The diaphragm-type pressure gauge G includes, as main constituent elements, a housing 3 communicating with the internal space of the vacuum vessel 2 through a flange (attaching portion) 3a, two sensor chips 18 and 22 disposed in the housing 3, and an electric circuit 7 (circuit portion) which outputs measurement values from the sensor chips 18 and 22 as pressure values. The housing 3 is a stainless case which enables circulation (introduction) of gas molecules (gas) from the vacuum vessel 2 into the internal space of the housing 3 by making the internal space of the housing 3 communicate with the internal space of the vacuum vessel 2 through the flange 3a.

A hermetic terminal 19 is a member which introduces an electrode member into the space on the vacuum side while ensuring airtightness. The housing 3 and the hermetic terminal 19 separate a space on the atmospheric side from a space on the vacuum side. The sensor chips 18 and 22 are provided in the space on the vacuum side of the hermetic terminal 19 provided in the housing 3, and the electric circuit 7 is provided in the space on the atmospheric side. In addition, the housing 3 is provided with a particle filter 3b which prevents the intrusion of particles into the housing 3.

The particle filter 3b is, for example, a ceramic filter which removes particles and is provided at a position between the sensor chips 18 and 22 and the flange 3a to prevent particles flying from the vacuum vessel 2 from adhering to the sensor chips 18 and 22. The electric circuit 7 can be connected to an external control apparatus or display apparatus via an electric output terminal 12. An I/O output terminal 17 outputs, to the outside, a signal indicating whether the electrical signal output from the electric output terminal 12 originates from the sensor chip 18 or the sensor chip 22. The two sensor chips 18 and 22 each are attached to the hermetic terminal 19, thereby forming a sensor chip assembly (sensor unit). In the case shown in FIG. 1, the diaphragm-type pressure gauge G includes the electric circuit 7 inside the housing 3. However, the electric circuit (circuit portion) 7 may be provided as a discrete component outside the diaphragm-type pressure gauge instead of being provided inside the diaphragm-type pressure gauge.

Figure 2:
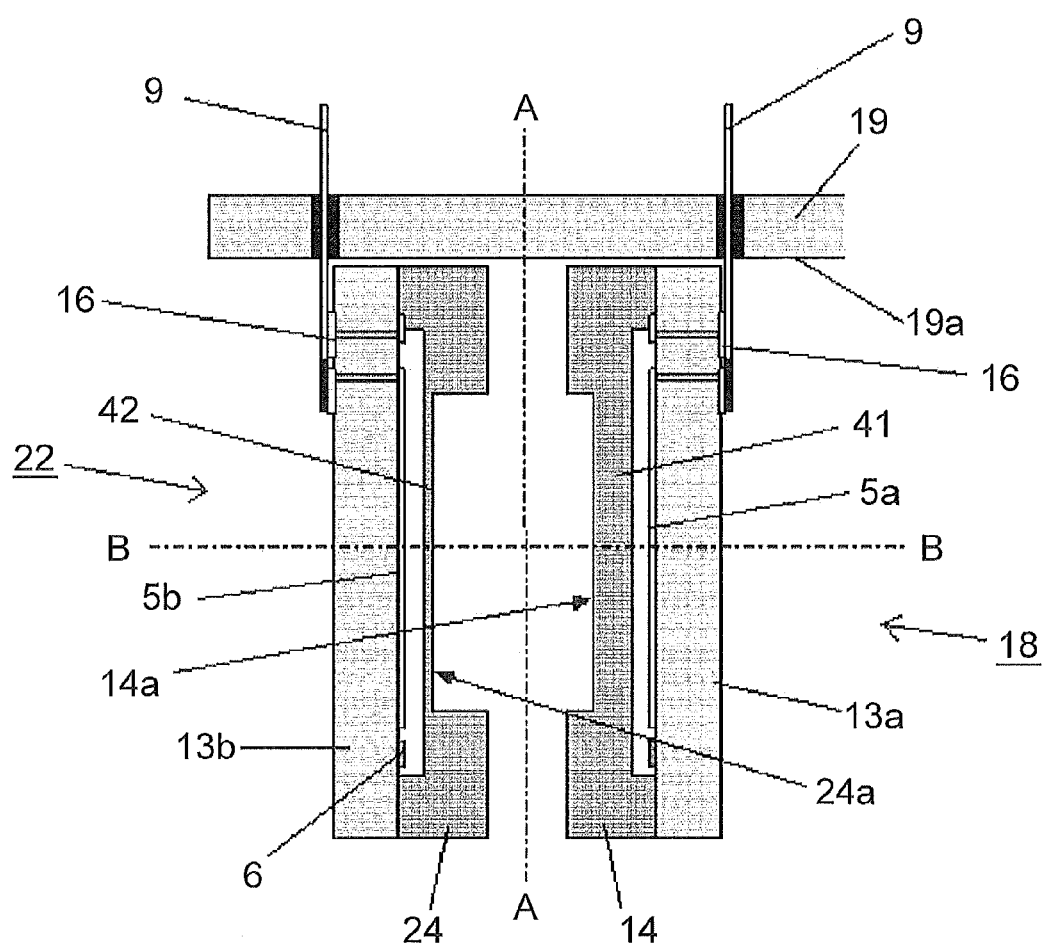
FIG. 2 is a sectional view of a sensor chip assembly according to an embodiment of the present invention.
Figure 3:
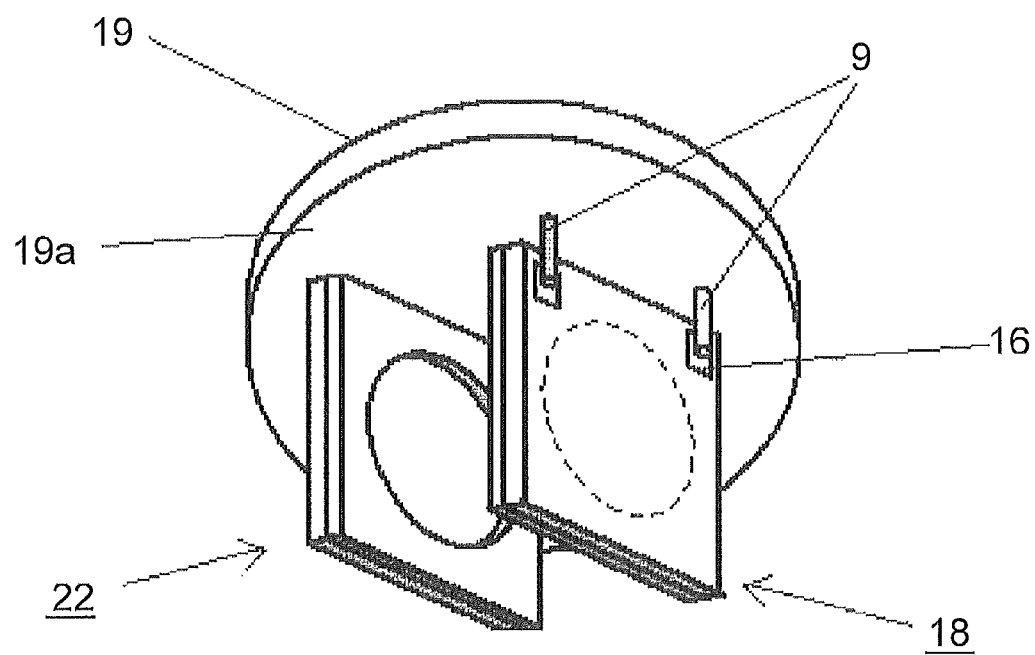
FIG. 3 is a perspective view of the sensor chip assembly according to the embodiment of the present invention.

FIG. 2 is an enlarged sectional view of the sensor chip assembly. FIG. 3 is a perspective view of the sensor chip assembly. The sensor chips 18 and 22 will be described with reference to FIG. 2. The sensor chip 18 can be manufactured by, for example, a micromachine technique using a semiconductor manufacturing process. The sensor chip 18 is formed by bonding an insulating substrate 13a made of soda glass to a silicon substrate 14 made of single crystal silicon so as to form a gap (reference pressure chamber) between them. A portion (elastic structure) having elasticity is formed as a diaphragm electrode 41 on part of the silicon substrate 14.

The diaphragm electrode 41 can be a portion which has a circular shape and is formed by thinning part of the silicon substrate. The diaphragm electrode 41 is configured to deflect in accordance with a pressure. A circular fixed electrode 5a can be provided on the insulating substrate 13a so as to face the diaphragm electrode 41. The pressure gauge calculates a pressure value based on the capacitance between the fixed electrode 5a and the diaphragm electrode 41. That is, the diaphragm electrode 41 deflects in accordance with a pressure to change the distance between the diaphragm electrode 41 and the fixed electrode 5a. This changes the capacitance. The space between the fixed electrode 5a and the diaphragm electrode 41 is an airtight reference pressure chamber. A getter 6 is disposed in this space to set a predetermined pressure (reference pressure).

The sensor chip 22 can also have the same structure as that of the sensor chip 18. A circular diaphragm electrode 42 is formed on a silicon substrate 24. A fixed electrode 5b is provided on an insulating substrate 13b so as to face the diaphragm electrode 42. The pressure gauge calculates a pressure from the capacitance between the fixed electrode 5b and the diaphragm electrode 42. The diaphragm electrode 41 of the sensor chip 18 and the diaphragm electrode 42 of the sensor chip 22 have different thicknesses so as to have optimal detection sensitivity with respect to different pressure regions.

More specifically, the diaphragm electrode 41 is formed thicker than the diaphragm electrode 42 and has high sensitivity on the high pressure side (low vacuum side). The diaphragm electrode 42 thinner than the diaphragm electrode 41 has high sensitivity on the lower pressure side (high vacuum side). In this embodiment, the range in which pressure measurement results on the diaphragm electrode 41 are output is 100 Pa to 100,000 Pa. The range in which pressure measurement results on the diaphragm electrode 42 are output is set to 0.01 Pa to 100 Pa. Note that the capacitor constituted by the diaphragm electrode 41 (42) and the fixed electrode 5a (5b) is connected to a conductive wiring 9 of the hermetic terminal 19 via an electrode pad 16.

In the sensor chip assembly, both the sensor chip 18 and the sensor chip 22 are arranged in postures in which their diaphragm electrodes are perpendicular to a support surface 19a of the hermetic terminal 19. The conductive wirings 9 extend through the hermetic terminal 19 so as to hold airtightness. The sensor chips 18 and 22 are fixed to the hermetic terminal 19 by connecting the conductive wirings 9 to the electrode pads 16 of the sensor chips 18 and 22. The sensor chips 18 and 22 are fixed to the hermetic terminal 19 so as to have a predetermined gap between them. The gap between the sensor chips 18 and 22 and the hermetic terminal 19 is provided to prevent the sensor chips 18 and 22 from receiving any stress from the hermetic terminal 19 due to deformation caused by thermal expansion.

The diaphragm electrodes 41 and 42 are arranged to face each other and can measure the pressure of the space between the sensor chips 18 and 22. Since the two sensor chips 18 and 22 measure the same space, no error occurs regardless of measurement positions. In addition, the support surface 19a of the hermetic terminal 19 is provided parallel to an attaching surface 3c of the flange 3a. That is, the sensor chips 18 and 22 are attached in a direction to make the diaphragm electrodes 41 and 42 perpendicular to the attaching surface 3c of the flange 3a.

A surface of the diaphragm electrode 41 (or 42) which faces the fixed electrode 5a (or 5b) is defined as the measurement surface of the diaphragm electrode 41 (or 42). The diaphragm electrode 41 and the diaphragm electrode 42 are arranged such that the measurement surface of the diaphragm electrode 41 becomes parallel to the measurement surface of the diaphragm electrode 42. Assume that in the description of the specification, the measurement surface of the sensor chip 18 means the measurement surface of the diaphragm electrode 41 of the sensor chip 18. Likewise, the measurement surface of the sensor chip 22 means the measurement surface of the diaphragm electrode 42 of the sensor chip 22.

The diaphragm electrode 41 is provided so as to make its measurement surface parallel to a central line A-A (see FIGS. 1 and 2) of the opening of the flange 3a. When the diaphragm-type pressure gauge G is attached to the vacuum vessel 2, since a gas (gas molecules) introduced from an opening (port) of the vacuum vessel 2 into the housing 3 does not directly collide with the measurement surface of the diaphragm electrode 41, it is possible to obtain stable measurement values. This can protect the diaphragm electrode 41 against an abrupt pressure change or impact at the early stage of evacuating operation or at the time of gas introduction. The same applies to the measurement surface of the diaphragm electrode 42.

As in the case of the diaphragm-type pressure gauge G, the central line A-A is preferably located at the front middle of each of the measurement surfaces of the diaphragm electrodes 41 and 42. However, the above effect can be expected even if the central line A-A is not located at the front middle of each measurement surface as long as each measurement surface is substantially parallel to the central line A-A. The central line A-A (central axis) is the central line of an introduction path through which a gas flows when the diaphragm-type pressure gauge G is attached to the port of the vacuum vessel 2, and is a line parallel to the introduction direction of a gas introduced from the vacuum vessel 2 into the housing 3. The introduction direction of a gas is the flowing direction of the gas between the vacuum vessel 2 and the housing 3. More specifically, this direction is a direction in which a gas moving from the vacuum vessel 2 into the housing 3 moves near the inlet through which the gas is introduced into the housing 3. The introduction path through which a gas flows is a portion formed on the flange 3a side of the housing 3, and guides the gas to the space in which the sensor chips 18 and 22 are arranged.

Figure 4:
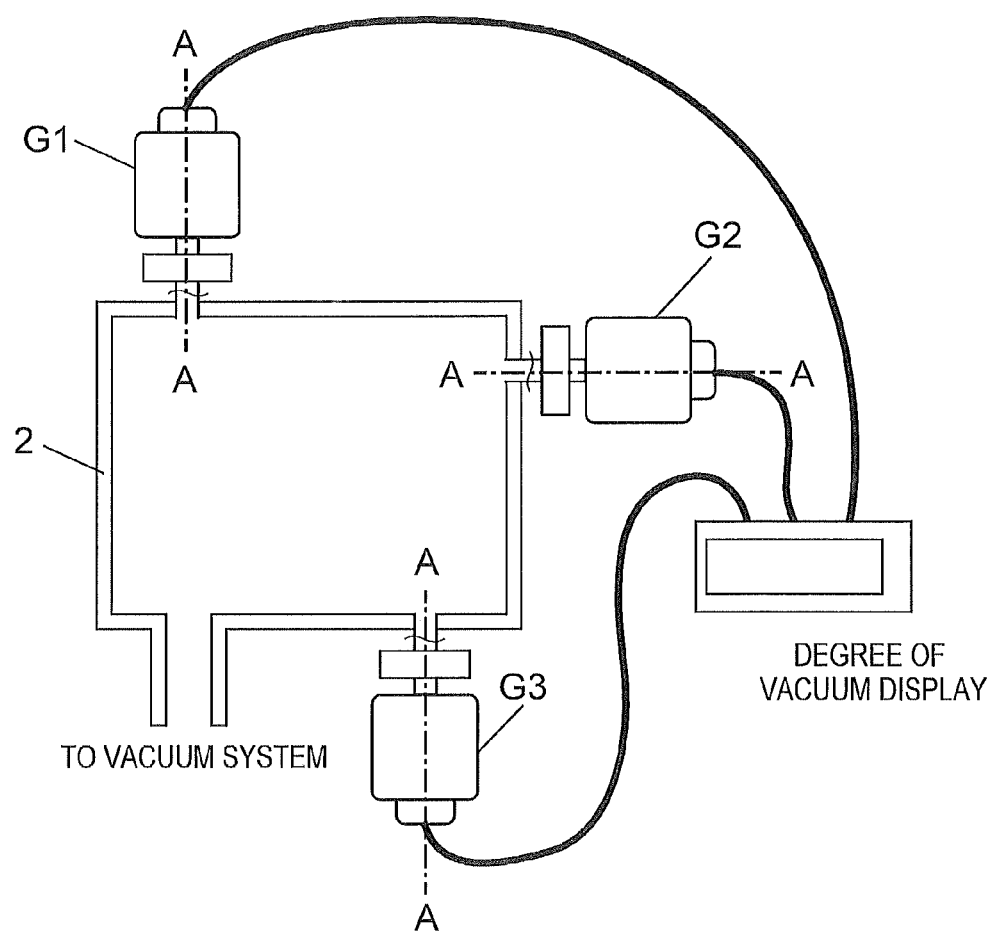
FIG. 4 is a view showing an example of how the diaphragm-type pressure gauge according to the embodiment of the present invention is attached to a vacuum vessel.

FIG. 4 shows an example of attaching the diaphragm-type pressure gauge G to the vacuum vessel 2. The vacuum vessel 2 and the diaphragm-type pressure gauge G are constituent elements of the vacuum processing apparatus. Three diaphragm-type pressure gauges G (G1, G2, and G3) are attached to the ports provided on three wall surfaces of a vacuum vessel 2a. More specifically, the hermetic terminal 19 of the diaphragm-type pressure gauge G1 is located above (in a direction opposite to the direction of gravitational force) the sensor chips 18 and 22, and the hermetic terminal 19 of the diaphragm-type pressure gauge G2 is located parallel to the sensor chips 18 and 22. The hermetic terminal 19 of the diaphragm-type pressure gauge G3 is located below (in the direction of gravitational force) the sensor chips 18 and 22. In this case, the ports are opening portions which are provided in the vacuum vessel for the attachment of sensors such as vacuum gauges and the introduction of cables.

The sensor chips 18 and 22 of each of the diaphragm-type pressure gauges G1, G2, and G3 are attached so as to make the measurement surfaces of the diaphragm electrodes 41 and 42 become parallel to the direction of gravitational force. In other words, the sensor chips 18 and 22 are arranged such that the normal (corresponding to a line B-B in FIG. 2) of the measurement surfaces of the diaphragm electrodes 41 and 42 is perpendicular to the direction of gravitational force. The diaphragm electrodes 41 and 42 and the fixed electrodes 5a and 5b each have a circular shape. Although the diaphragm-type pressure gauges G1, G2, and G3 have different attaching angles around an axis in the vertical direction, the diaphragm electrodes 41 and 42 of the diaphragm-type pressure gauges G1, G2, and G3 do not deflect or deflect in the same shape regardless of the attaching angles. Therefore, the capacitances (pressures) measured by the diaphragm-type pressure gauges G1, G2, and G3 are the same. That is, the diaphragm-type pressure gauge G causes no error in a measurement value regardless of the attaching angle around an axis in the vertical direction as long as the measurement surfaces of the diaphragm electrodes 41 and 42 are located parallel in the direction of gravitational force. In the following description, when simply written as "attaching angle", it means an attaching angle around an axis in the vertical direction.

Referring to FIG. 4, if the attaching angle of the diaphragm-type pressure gauge G1 is 0°, the attaching angles of the diaphragm-type pressure gauges G2 and G3 are respectively 90° and 180°. Obviously, the same effect can be obtained with other attaching angles. That is, the diaphragm-type pressure gauge G may be arranged so as to make the measurement surfaces of the diaphragm electrodes 41 and 42 parallel to the direction of gravitational force.

As described above, even if diaphragm-type pressure gauges are attached at different attaching angles, they can measure the same measurement value as long as the diaphragm electrodes deflect in the same shape due to the gravitational force regardless of the attaching angles. For this reason, the diaphragm electrodes may have a polygonal shape having rotational symmetry such as a square. In this case, the attaching angles of the diaphragm-type pressure gauges (the attaching angles around the normal of the measurement surfaces of the diaphragm electrodes) are set such that the arrangements of the polygonal shapes with respect to the direction of gravitational force become the same symmetrical shape. For example, in the case of rectangular diaphragm electrodes, the electrodes may be arranged so as to make the respective sides perpendicular to the direction of gravitational force or make the diagonal lines parallel to the direction of gravitational force in addition to making the measurement surfaces parallel to the direction of gravitational force.

A mark M indicating the directions of the diaphragm electrodes 41 and 42 can be formed on the outer surface of the housing 3 so as to allow the measurement surfaces of the diaphragm electrodes 41 and 42 to be parallel to the direction of gravitational force. For example, a logo is printed on the outer side of the housing 3. Attaching the housing 3 to the vacuum vessel 2 so as to make the surface on which the logo printed parallel to the direction of gravitational force can arrange the measurement surfaces of the diaphragm electrodes 41 and 42 to be parallel to the direction of gravitational force.

The diaphragm-type pressure gauges G1, G2, and G3 can be arranged such that the centers of the spaces between the sensor chips 18 and 22 are located on the central lines A-A of the opening portions (ports) of the vacuum vessel 2. That is, the two diaphragm electrodes 41 and 42 can be symmetrically arranged on the two sides of the central line A-A.

In other words, the central line A-A can be located at an equal distance from the two diaphragm electrodes 41 and 42. Arranging the sensor chips 18 and 22 so as to locate the central line A-A at an equal distance from the two diaphragm electrodes 41 and 42 in this manner will introduce many of the gas molecules entering the housing 3 through the opening (port) of the vacuum vessel 2 into the space which the measurement surfaces of the diaphragm electrodes 41 and 42 face. In addition, the two sensor chips 18 and 22 are arranged symmetrically with respect to the introduction path for gas molecules. This can ensure high measurement accuracy.

In addition, arranging the diaphragm electrodes 41 and 42 away from the central line A-A can measure the degree of vacuum in the region spaced apart from the central line A-A. In the housing 3, since a gas flows along the central line A-A, the region spaced away from the central line A-A is similar in pressure to the inside of the vacuum vessel 2. It is therefore possible to accurately measure a pressure in the vacuum vessel 2. Note that the sensor chip 41 (or 42) may be arranged so as to locate the central line A-A on the measurement surface of the diaphragm electrode. Obviously, even in this case, attaching the diaphragm electrode so as to make the measurement surface parallel to the direction of gravitational force and the central line A-A can avoid any change in measurement value accompanying a change in attaching angle.

Figure 5:
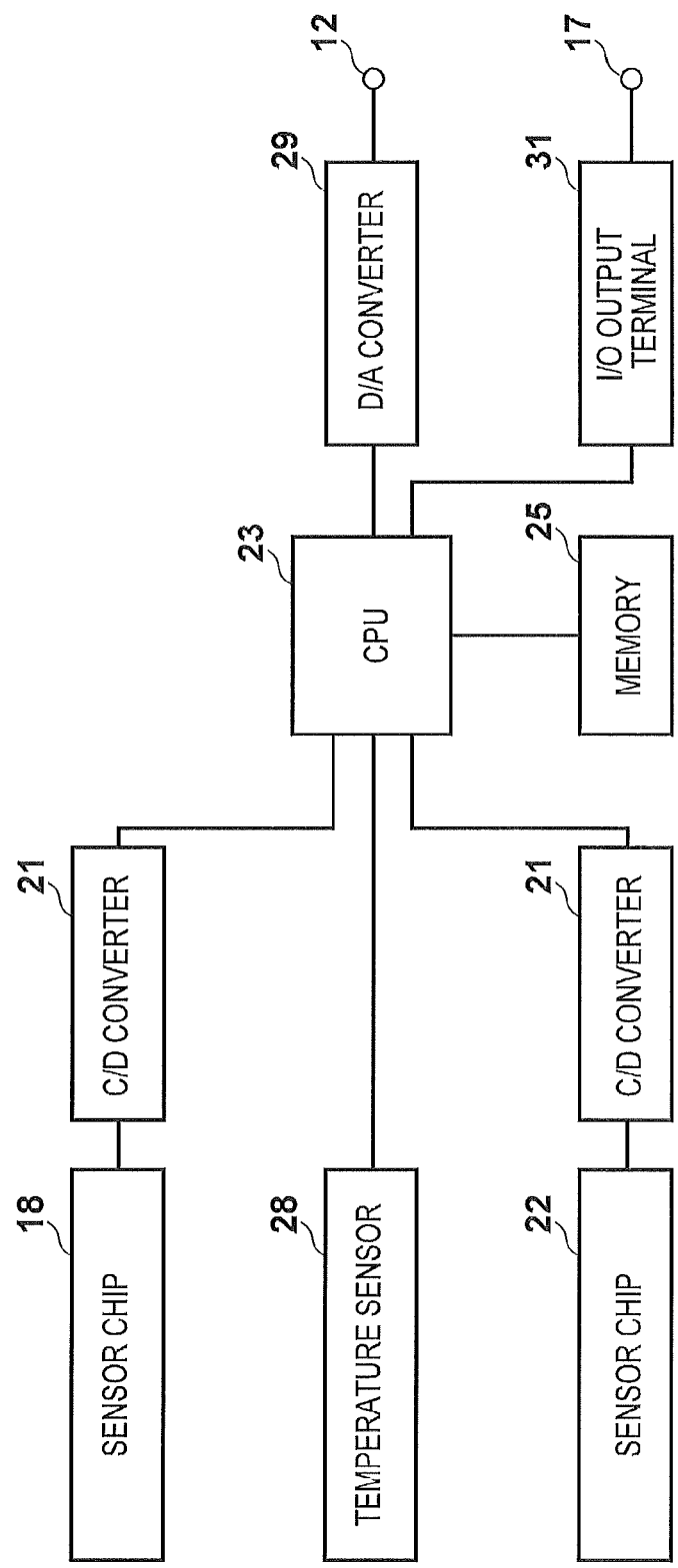
FIG. 5 is a block diagram showing the system configuration of the diaphragm-type pressure gauge according to the embodiment of the present invention.

Control at the time of measurement by the diaphragm-type pressure gauge G will be described below. The diaphragm-type pressure gauge G converts the deflection amounts of the diaphragm electrodes 41 and 42 into an electrical signal, compares a value corresponding to the electrical signal with data recorded in advance, and determines a measured pressure value. The diaphragm-type pressure gauge G will be described in detail with reference to the block diagram of FIG. 5 which shows the system configuration. A control circuit for the diaphragm-type pressure gauge G is formed in the electric circuit 7, and includes the sensor chips 18 and 22, a C/D converter 21, a CPU (Central Processing Unit) 23, a temperature sensor 28, a measurement pressure adjustment apparatus 27, a memory 25, a D/A converter 29, and an I/O output terminal 31. As described above, the sensor chip 18 has a capacitor structure (high pressure side sensor) constituted by the diaphragm electrode 41 and the fixed electrode 5a. Likewise, the sensor chip 22 has a capacitor structure (low pressure side sensor) constituted by the diaphragm electrode 42 and the fixed electrode 5b.

The C/D converters 21 are configured to convert the capacitances output from the sensor chips 18 and 22 into digital values, and are respectively provided for the sensor chips 18 and 22. The memory 25 is a storage apparatus allowing the CPU 23 to perform write access and read access. The D/A converter 29 converts the digital value output from the CPU 23 into an analog value.

The C/D converters 21 convert the analog signals (capacitances) output from the sensor chips 18 and 22 into digital values (the digital values of capacitances) and send them to the CPU 23. The CPU 23 calculates a digital value (the digital value of a pressure) proportional to the pressure value by referring to a measurement value from the temperature sensor 28 and an input from the memory 25, and sends the digital value to the D/A converter 29. The D/A converter 29 converts an output signal (the voltage value of a pressure) corresponding to a pressure into an analog value and outputs it to the electric output terminal 12. At this time, the I/O terminal outputs, to the outside, a signal indicating whether the signal output from the electric output terminal 12 has been measured by the sensor chip 18 or 22. The signals output from the electric output terminal 12 and the I/O output terminal 17 are sent to, for example, the display apparatus (see FIG. 4) and displayed as measurement pressures.

Although the diaphragm-type pressure gauge G of this embodiment includes two sensor chips, namely the sensor chips 18 and 22, the number of sensor chips is not limited to two and may be three or more. Alternatively, the number of sensor chips may be one as in another embodiment. In addition, if the sensor chips 18 and 22 are elements which output measurement values as analog values as voltages, A/D converters which convert analog values into digital values are attached to the sensor chips instead of the C/D converters 21.

Outputs from the sensor chips 18 and 22 can change due to changes in ambient temperature in addition to pressure. For this reason, this pressure gauge collects the output characteristics of digital values for each ambient temperature of each of the sensor chips 18 and 22 as data in advance and stores the temperature characteristic data in the memory 25. The temperature sensor 28 shown in FIG. 5 measures an ambient temperature. When calculating measurement values from the sensor chips 18 and 22 as signals (the digital values of pressures) to be output to the D/A converter 29, the CPU 23 corrects the measurement values by referring to temperature characteristic data corresponding to the ambient temperature.

Figure 6:
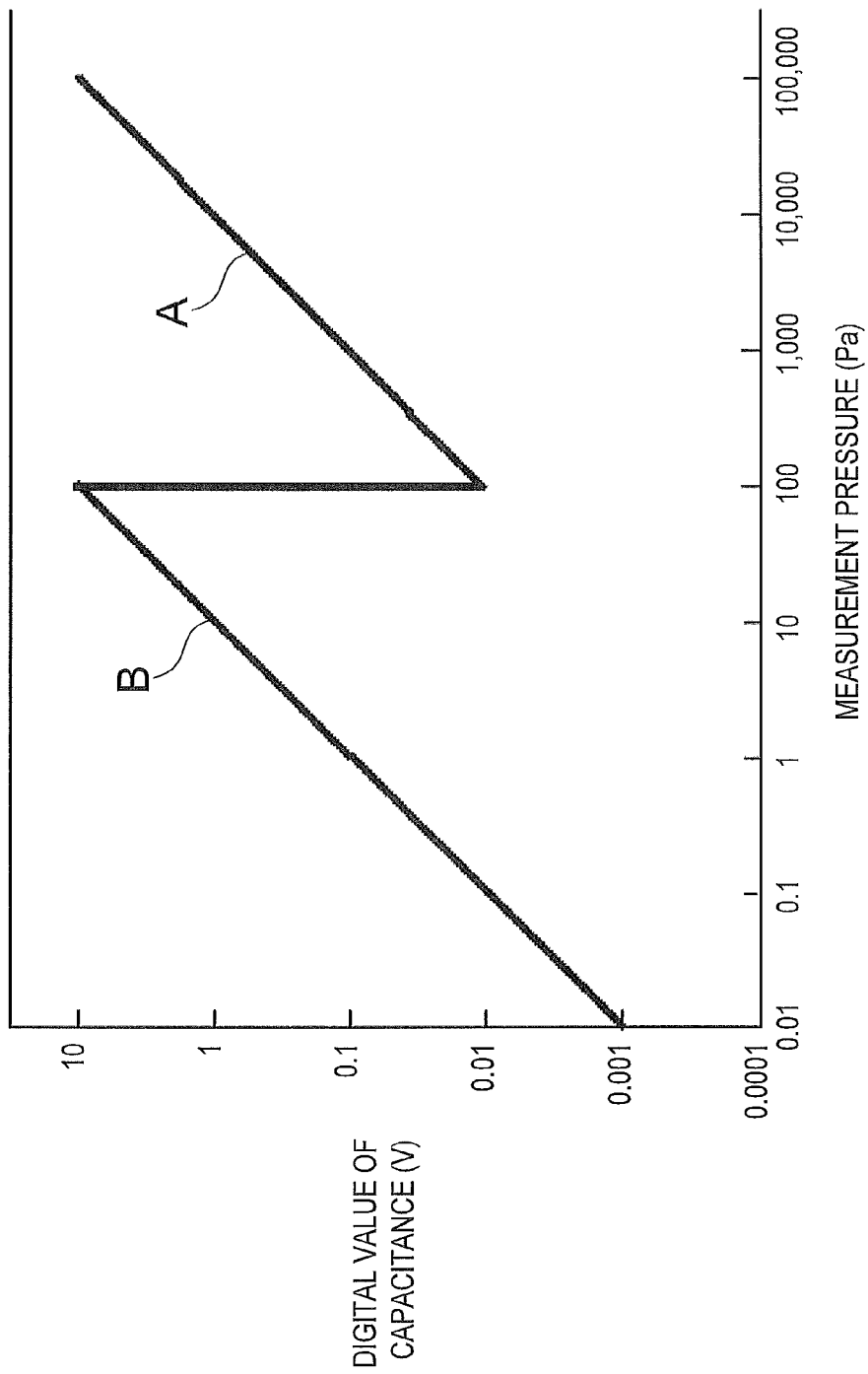
FIG. 6 is a graph showing the relationship between measurement pressures and the digital values of capacitances according to the embodiment of the present invention.

FIG. 6 is a graph showing the relationship between measurement pressures and the values of capacitances output from each C/D converter 21. Referring to FIG. 6, characteristic A indicates the output characteristic of the sensor chip 18 with a full scale pressure of 100,000 Pa, and characteristic B indicates the output characteristic of the sensor chip 22 with a full scale pressure of 100 Pa. More specifically, in the diaphragm-type pressure gauge G, outputs from the fixed electrode 5a correspond to output characteristic A, and outputs from the fixed electrode 5b correspond to output characteristic B. In a region with measurement pressures equal to or higher than 100 Pa, the CPU 23 processes an output signal (the digital value of a capacitance) indicating the pressure detected by the fixed electrode 5a, thereby calculating the signal as the digital value of the pressure.

On the other hand, with respect to a measurement pressure lower than 100 Pa, the CPU 23 processes an output signal (the digital value of a capacitance) indicating the pressure detected by the fixed electrode 5b, thereby calculating the signal as the digital value of the pressure. The D/A converter 29 then converts the digital value of the pressure output from the CPU 23 into a voltage value (analog value). Note that since the CPU 23 refers to an input signal from the temperature sensor 28 and temperature characteristic data in the memory 25, when the output terminal of the D/A converter 29 outputs a pressure measurement value, it outputs a value (pressure value) obtained by correcting the influence of an ambient temperature.

Figure 7:
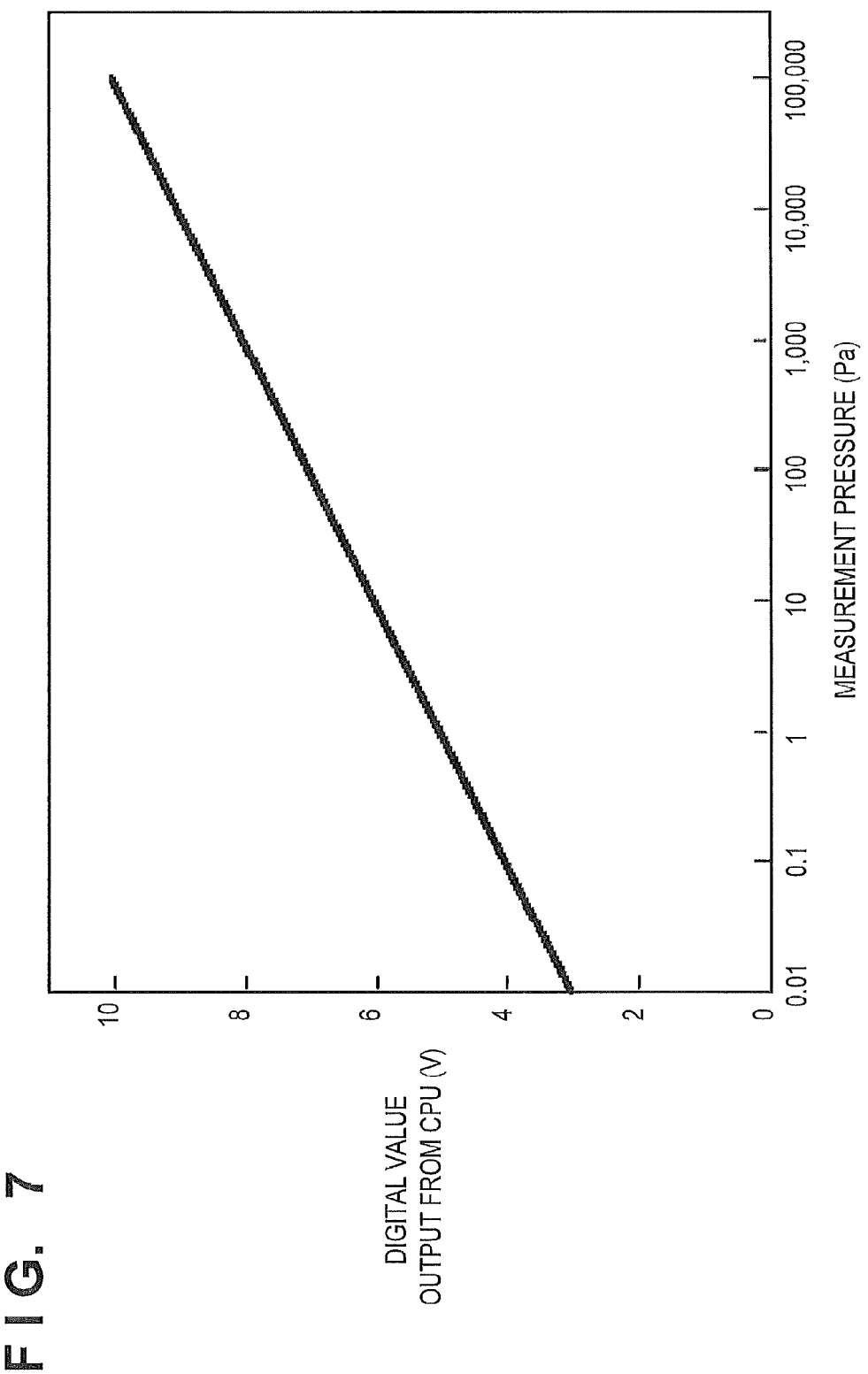
FIG. 7 is a graph showing the relationship between measurement pressures from the diaphragm-type pressure gauge and the digital values of pressures according to the embodiment of the present invention.

As a result, the diaphragm-type pressure gauge G has the pressure/output voltage characteristic shown in FIG. 7. FIG. 7 shows a case in which adjustment is performed to make the logarithmic values of the digital values of the pressures output from the CPU 23 have a linear relationship with the logarithmic values of pressures in the entire measurement pressure region. When outputting an analog signal corresponding to a pressure from the electric output terminal 12, the CPU 23 outputs the I/O output signal shown in FIG. 8 from the I/O output terminal 17. This I/O output signal enables to identify whether the output terminal of the D/A converter 29 has output the pressure detection result from a specific one of the sensor chips 18 and 22.

Figure 8:
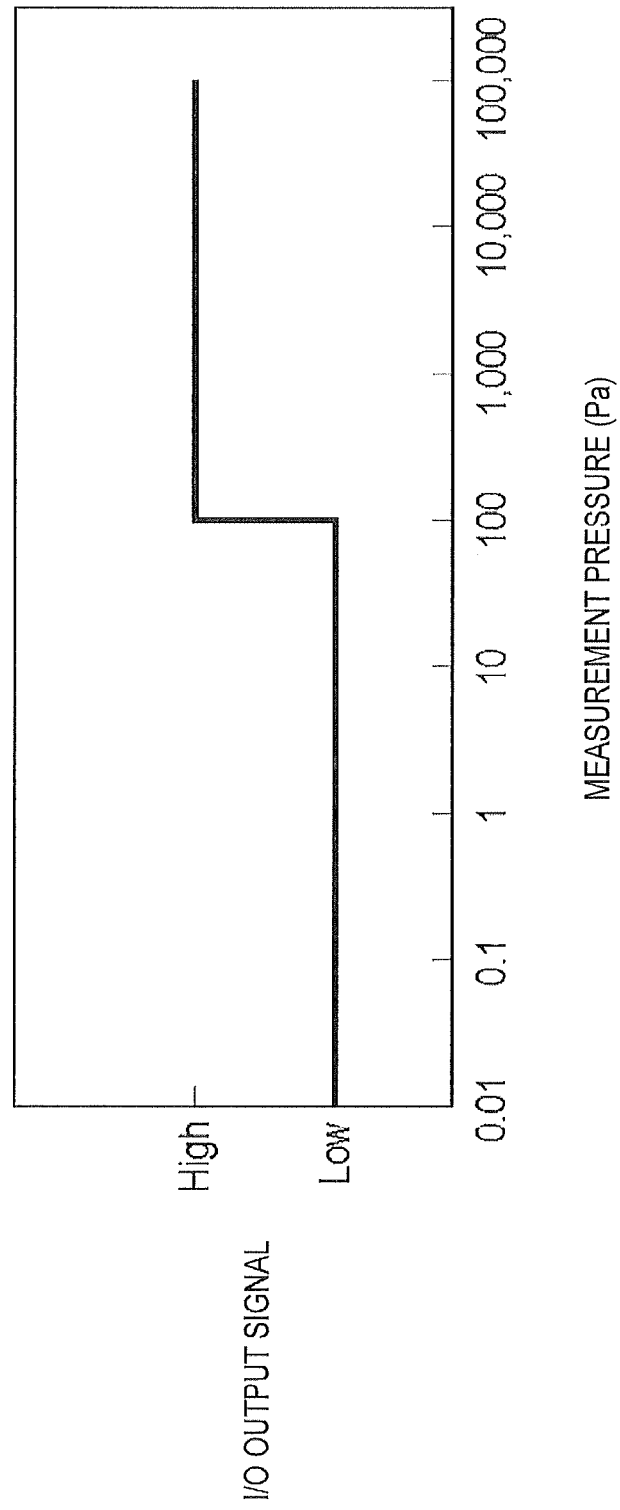
FIG. 8 is a graph showing the relationship between measurement pressures and I/O output signals.

Referring to FIG. 8, a low voltage (Low) indicates an I/O output signal when the D/A converter 29 has output a detection result (first pressure value) from the low pressure side sensor chip 22 (fixed electrode 5b). A high voltage (High) indicates an I/O output signal when the D/A converter 29 has output a detection result (second pressure value) from the high pressure side sensor chip 22 (fixed electrode 5a). Note that the pressure detection elements indicated by I/O output signals may be opposite to those described above.

Figure 9:
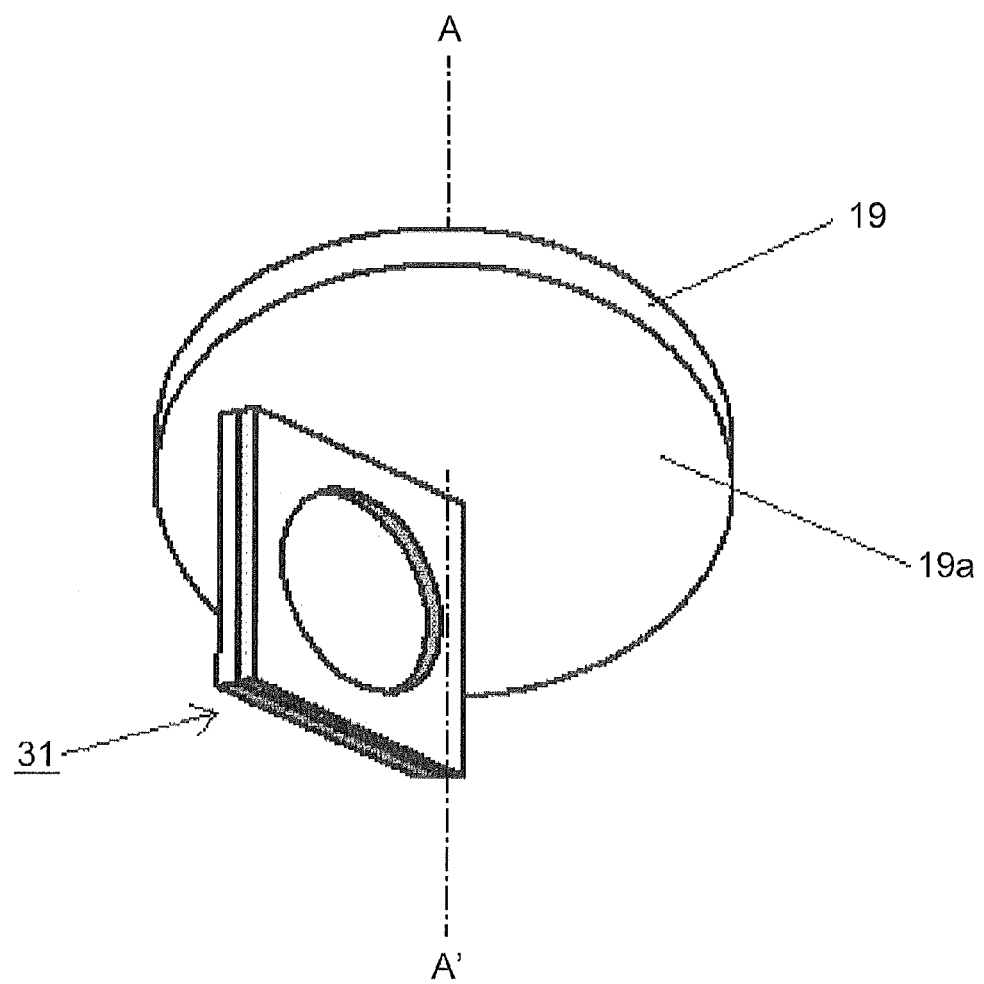
FIG. 9 is a perspective view of a sensor chip assembly according to another embodiment of the present invention.

FIG. 9 shows a sensor chip assembly of a diaphragm-type pressure gauge according to another embodiment. This embodiment differs from the above embodiment in the structure of the sensor chip assembly. That is, the sensor chip assembly (sensor unit) of this embodiment includes only one sensor chip 31. The sensor chip 31 is identical to the sensor chip 18 (or 22), and includes a diaphragm electrode having a circular shape. In this case as well, if the diaphragm electrode is attached so as to make its measurement surface parallel to the direction of gravitational force, no change in measurement value occurs accompanying a change in attaching angle.

The sensor chip 31 is attached to a support surface 19a of a hermetic terminal 19 via a conductive wiring 9. The measurement surface of the diaphragm electrode of the sensor chip 31 is spaced apart from a central line A-A by a predetermined distance. In this case, the predetermined distance is the distance between the measurement surface of the diaphragm electrode and the central line A-A while the central line A-A is located in front of the measurement surface of the diaphragm electrode. Arranging the measurement surface of the diaphragm electrode away from the central line A-A can measure the degree of vacuum of a region on an extension of the central line A-A. In a housing 3, since the pressure of a region on an extension of the central line A-A is close to the internal pressure of the vacuum vessel 2, the pressure gauge can measure a pressure more accurately. Note that the central line A-A is located so as to overlap the central axis of the above gas introduction path.

According to the diaphragm-type pressure gauge of the present invention, arranging the measurement surface of the diaphragm electrode parallel to the direction of gravitational force prevents the occurrence of an error in a measurement value due to an attaching angle around an axis in the vertical direction. This reduces restrictions on attaching positions and improves operability. Note that it is possible to arrange the central line A-A on the measurement surface of the diaphragm electrode of the sensor chip 31. Obviously, in this case as well, attaching the diaphragm electrode so as to make the measurement surface parallel to the direction of gravitational force and the central line A-A will prevent the occurrence of a change in measurement value accompanying a change in attaching angle.

The present invention is not limited to the above embodiments and various changes and modifications can be made within the spirit and scope of the present invention. Therefore, to apprise the public of the scope of the present invention, the following claims are made.

REFERENCE SIGNS LIST

G: diaphragm-type pressure gauge, 1: reference pressure chamber, 2: vacuum vessel, 3: housing, 3a: flange, 41, 42, 104: diaphragm electrode, 5a, 5b: fixed electrode, 6: getter, 7: electric circuit, 9: conductive wiring, 10: correction electrode, 12: electric output terminal, 13a, 13b: insulating substrate, 14, 24: silicon substrate, 16: electrode pad, 17: I/O output terminal, 18, 22, 31: sensor chip, 19: hermetic terminal, 21: C/D converter, 23: CPU, 25: memory, 28: temperature sensor, 29: D/A converter

The invention claimed is:

1. A diaphragm-type pressure gauge which is attached to a vessel to be measured and measures a pressure by introducing a gas inside the vessel, the gauge comprising:
a housing having a member separating an internal space of the housing into a first space and a second space, the first space communicating with the vessel, and the gas being introduced into the first space; and
a sensor unit arranged in the housing, the sensor unit including an insulating substrate having a first surface and a second surface opposing the first surface, a fixed electrode arranged on the first surface, a diaphragm electrode having a measurement surface facing the fixed electrode and arranged parallel to an introduction direction of the gas, the fixed electrode and the measurement surface facing an airtight reference pressure chamber formed between the insulating substrate and the diaphragm electrode, the second surface facing the first space, a surface of the diaphragm electrode, which opposes the measurement surface, facing the first space,
wherein the insulating substrate and the diaphragm electrode are arranged in the first space, a capacitor constituted by the fixed electrode and the diaphragm electrode is connected to an electrode pad attached to the insulating substrate, the electrode pad is connected to a conductive wiring in the first space, and the conductive wiring extends through the member from the first space to the second space.

2. The diaphragm-type pressure gauge according to claim 1,
wherein when the housing is attached to the vessel, the measurement surface of the diaphragm electrode is arranged parallel to a direction of gravitational force.

3. The diaphragm-type pressure gauge according to claim 1, further comprising:
an attaching portion configured to attach the housing to the vessel so as to make the measurement surface of the diaphragm electrode parallel to a direction of gravitational force.

4. The diaphragm-type pressure gauge according to claim 1, wherein the diaphragm electrode comprises two diaphragm electrodes, and
measurement surfaces of the two diaphragm electrodes are arranged parallel.

5. The diaphragm-type pressure gauge according to claim 4, wherein the housing includes an introduction path on which a gas is introduced from the vessel into the first space of the internal space of the housing, and
the measurement surfaces of the two diaphragm electrodes are arranged on two sides of a central axis of the introduction path.

6. The diaphragm-type pressure gauge according to claim 4, wherein the housing includes an introduction path on which a gas is introduced from the vessel into the first space of the internal space of the housing, and
the two diaphragm electrodes are symmetrically arranged with respect to a central axis of the introduction path.

7. The diaphragm-type pressure gauge according to claim 1, wherein the housing includes an introduction path on which a gas is introduced from the vessel into the first space of the internal space of the housing, and a measurement surface of the diaphragm electrode is spaced apart from a central axis of the introduction path.

8. The diaphragm-type pressure gauge according to claim 1 further comprising:

an attaching portion configured to attach the housing to the vessel, wherein the measurement surface of the diaphragm electrode is parallel to a direction in which a gas inside the vessel flows in the first space of the internal space, and an outer surface of the housing is provided with a mark with which the diaphragm-type pressure gauge is attached to the vessel so as to make the measurement surface parallel to a direction of gravitational force.

9. The diaphragm-type pressure gauge according to claim 1, wherein the diaphragm electrode extends parallel to a direction of gravitational force.

10. The diaphragm-type pressure gauge according to claim 1, further comprising:

an output terminal arranged on the housing; and an electric circuit arranged in the second space and configured to output measurement value to the output terminal in accordance with a signal supplied from the sensor unit via the conductive wiring.

11. The diaphragm-type pressure gauge according to claim 1, wherein the insulating substrate is fixed to the member such that a gap is formed between the insulating substrate and the member.

12. The diaphragm-type pressure gauge according to claim 1, wherein the insulating substrate is fixed to the member by connecting the conductive wiring to the electrode pad attached to the insulating substrate.

* * * * *